United States Patent
Stenbacka et al.

(10) Patent No.: US 11,061,300 B2
(45) Date of Patent: Jul. 13, 2021

(54) FLASH HOUSING AND A METHOD FOR CONTROLLING A FLASH LIGHT BY MANUAL ROTATION OF A ZOOM ELEMENT

(71) Applicant: PROFOTO AKTIEBOLAG, Sundbyberg (SE)

(72) Inventors: Emil Stenbacka, Stockholm (SE); Johan Anséhn, Stockholm (SE)

(73) Assignee: PROFOTO AKTIEBOLAG, Sundbyberg (SE)

( * ) Notice: Subject to any disclaimer, the term of this patent is extended or adjusted under 35 U.S.C. 154(b) by 0 days.

(21) Appl. No.: 16/646,121

(22) PCT Filed: Sep. 17, 2018

(86) PCT No.: PCT/SE2018/050943
§ 371 (c)(1),
(2) Date: Mar. 10, 2020

(87) PCT Pub. No.: WO2019/054935
PCT Pub. Date: Mar. 21, 2019

(65) Prior Publication Data
US 2020/0272028 A1    Aug. 27, 2020

(30) Foreign Application Priority Data
Sep. 18, 2017    (SE) .................................... 1751143-7

(51) Int. Cl.
*G03B 15/05*    (2021.01)
*G02B 7/04*    (2021.01)

(52) U.S. Cl.
CPC ............... *G03B 15/05* (2013.01); *G02B 7/04* (2013.01); *G03B 2215/0514* (2013.01);
(Continued)

(58) Field of Classification Search
CPC ................ G03B 2215/0571; G03B 2215/0575
See application file for complete search history.

(56) References Cited

U.S. PATENT DOCUMENTS

| 2,906,862 A | 9/1959 | McCammon |
| 4,141,059 A | 2/1979 | Shiojiri |
(Continued)

FOREIGN PATENT DOCUMENTS

| CN | 101158800 A | 4/2008 |
| CN | 205334025 U | 6/2016 |
(Continued)

OTHER PUBLICATIONS

Nikon SB-700 user manual, selected pages, retrieved from https://downloadcenter.nikonimglib.com/en/products/245/SB-700.html on Dec. 31, 2020 (Year: 2010).*
(Continued)

*Primary Examiner* — Clayton E. LaBalle
*Assistant Examiner* — Leon W Rhodes, Jr.
(74) *Attorney, Agent, or Firm* — Knobbe, Martens, Olson & Bear, LLP (57) ABSTRACT

A flash housing for photographic purposes and method for controlling a flash light is disclosed. The flash housing comprises a flash forming element arranged to generate a flash light. The flash housing further comprises a lens element having a substantially circular cross-section and being arranged to let at least part of the generated flash light out of the flash housing so as to obtain the flash. The flash housing further comprises a zoom element rotatably arranged at least partly along the circumference of the lens element. The zoom element is operatively connected to the flash forming element so as to control movement of the flash forming element by manual rotation of the zoom element.

23 Claims, 6 Drawing Sheets

(52) U.S. Cl.
CPC ............... *G03B 2215/0525* (2013.01); *G03B 2215/0557* (2013.01); *G03B 2215/0592* (2013.01)

(56) References Cited

U.S. PATENT DOCUMENTS

| | | | |
|---|---|---|---|
| 4,356,538 A | 10/1982 | Plummer | |
| 4,423,940 A | 1/1984 | Kashihara et al. | |
| 4,662,733 A | 5/1987 | Feinbloom | |
| 4,914,461 A * | 4/1990 | Hori | G03B 13/16 396/176 |
| 4,916,579 A | 4/1990 | Simms | |
| 5,019,845 A | 5/1991 | Asakura et al. | |
| 5,023,639 A | 6/1991 | Ushiro et al. | |
| 5,871,272 A | 2/1999 | Sharrah et al. | |
| 5,878,291 A | 3/1999 | Hagiuda et al. | |
| 6,178,297 B1 * | 1/2001 | Ting | G03B 13/02 348/E5.029 |
| 6,349,175 B1 | 2/2002 | Tokunaga | |
| 6,481,869 B1 | 11/2002 | Horandel et al. | |
| 7,510,289 B2 | 3/2009 | Takekuma | |
| 7,684,691 B2 * | 3/2010 | Tokunaga | G03B 17/20 396/228 |
| 7,715,705 B2 | 5/2010 | Yasutomi et al. | |
| 8,665,358 B2 * | 3/2014 | Cho | G03B 3/10 348/345 |
| 9,110,355 B1 | 8/2015 | Nourbakhsh | |
| 2002/0064384 A1 | 5/2002 | Kawasaki et al. | |
| 2008/0259274 A1 | 10/2008 | Chinnock | |
| 2012/0219277 A1 | 8/2012 | Hartwig et al. | |
| 2015/0155728 A1 | 6/2015 | Feustel et al. | |
| 2016/0088278 A1 | 3/2016 | Velarde et al. | |
| 2020/0218135 A1 | 7/2020 | Stenbacka et al. | |

FOREIGN PATENT DOCUMENTS

| | | | |
|---|---|---|---|
| EP | 0382624 A2 | 8/1990 | |
| EP | 3163370 A1 | 5/2017 | |
| JP | 60083921 A * | 5/1985 | ............ G03B 15/05 |
| JP | 2007-218994 A | 8/2007 | |

OTHER PUBLICATIONS

U.S. Appl. No. 16/646,118, filed Mar. 10, 2020, Stenbacka et al.
International Search Report and Written Opinion of the International Authority for International Application No. PCT/SE2018/050940, dated Dec. 14, 2018, in 10 pages.
International Search Report and Written Opinion of the International Authority for International Application No. PCT/SE2018/050943, dated Dec. 11, 2018, in 13 pages.
Search Report issued in Chinese Patent Application No. 201811086232.8, dated Mar. 24, 2021, in 2 pages (English translation only).
Extended European Search Report for European Patent Application No. 18857164.0, dated May 3, 2021, in 7 pages.

* cited by examiner

FLASH HOUSING AND A METHOD FOR CONTROLLING A FLASH LIGHT BY MANUAL ROTATION OF A ZOOM ELEMENT

CROSS-REFERENCE TO RELATED APPLICATIONS

This application is the U.S. National Phase under 35 U.S.C. § 371 of International Application PCT/SE2018/050943, filed Sep. 17, 2018, which claims priority to SE Application No. 1751143-7, filed Sep. 18, 2017, the entire contents of each of which are incorporated by reference herein and made a part of this specification.

TECHNICAL FIELD

The present disclosure related to a flash housing arranged to generate a flash light and to let at least part of the generated flash light out of the flash housing so as to obtain the flash.

The present disclosure further relates to a method for controlling a flash light.

BACKGROUND

In order to be able to take photographs of a certain quality a flash device is often used to provide light or to improve the light in the photograph.

There are flash housings known in the art arranged to generate a flash light and to let at least part of the generated flash light out of the flash housing so as to obtain the flash.

SUMMARY

One object of the present disclosure is to provide an improved flash housing.

The present disclosure relates to a flash housing for photographic purposes. The flash housing comprises a flash forming element arranged to generate a flash light; a lens element having a substantially circular cross-section and being arranged to let at least part of the generated flash light out of the flash housing so as to obtain the flash, and a zoom element rotatably arranged at least partly along the circumference of the lens element. The zoom element is operatively connected to the flash forming element so as to control movement of the flash forming element by manual rotation of the zoom element along the circumference.

The flash housing is typically a small device such as an external flash device connectable to a camera. The flash housing may act both as an on-camera flash and as an off-camera flash. The off-camera flash may be adapted to communicate, possibly, wirelessly, with the camera.

In using the flash housing as presented above, the flash forming element, and accordingly flash light beam angle, is adjusted manually, by turning the zoom element. Thus, in different embodiments, the zoom element is arranged to control movement of the flash forming element to obtain a flash having a beam lobe with a desired beam angle.

The flash light beam angle is easily adjusted. The zoom element is manually rotated clockwise or counterclockwise to change the flash light beam angle. Further, the adjustment can be made with high accuracy as the zoom element provides a rotational control having a diameter even larger than the diameter of the lens element. Thus, the relatively small flash housing accommodates a relatively large rotational control substantially without altering the design and size of the flash housing. Further, manual operation of the zoom element is intuitive and easy to use, as the zoom element is manually operated in line with manual operation of a camera zoom.

The flash light beam angle can be adjusted at any time to match the user's preferences. For example, the flash light can be narrowed to highlight a selected part of an image captured while using the flash. The flash light is easy to control and can be set creatively. Further, several flash housings can be in communication with each other and cooperate to grow light shaping.

In order to create photographs of a high quality, where the photographer is able to enhance a photograph by means of a flash light, it is important to be able to generate a flash light with a beam lobe of a desired shape and quality. This disclosure discloses a solution where means for adjustment of the flash light are provided which allows for easy and accurate adjustment.

The flash forming element may comprise a flash tube and a reflector. Thereby, an efficient flash light can be created, wherein a large amount of light is emitted from the flash tube in a short period of time.

In different embodiments, the beam lobe has an essentially circular cross section. The cross section is characteristically arranged perpendicular to a beam axis of the beam lobe. Further, the cross section of the beam lobe of the flash is characteristically round and evenly distributed within its cross section. By emitting a beam lobe with an essentially circular cross section, the photographer is able to create a photograph with high quality. In addition, the border of the cross section of the beam lobe emitted from the flash housing may be made even, which further improves the quality of the photograph.

In different embodiments, the flash forming element is axially movable within the flash housing to control the beam angle of the beam lobe.

Thereby, the flash light can be controllable with accuracy to only be used on a part of the photograph or on the whole photograph, thereby creating a dynamic photograph of high quality.

When the flash forming element is in a first end position distant from the lens element, the flash light is in different embodiments incident on substantially the entire lens element. When the flash forming element is in a second end position closest to the lens element, the flash light is in different embodiments incident on a centre part of the lens element.

The rotational movement of the zoom element may be mechanically translated to the axial movement of the flash forming element.

The flash housing may comprise a transfer element arranged to transfer the rotational movement or position of the zoom element to an electrical signal. The axial movement or position of the flash forming element can then be controlled based on the electrical signal.

The transfer element may comprise a potentiometer, a Hall element, optical sensors or the like, arranged to transfer the rotational movement or position of the zoom element to the electrical signal.

In different embodiments, the electrical signal controls a positioner for control of the movement or the position of the flash forming element. The positioner may comprise a step motor.

In different embodiments, the flash housing further comprises a display element. The information related to the electrical signal can then be fed to the display element for display of information related to current zoom element rotational position/movement and accordingly, the flash light beam angle of a flash light beam lobe emitted from the flash housing with the current position of the flash forming element.

In different embodiments, the display element is arranged to display a symbol, the width of which is dependent on the beam angle. The symbol may for example have a U shape.

The use of such symbol for illustrating the flash light beam angle provides a very intuitive understanding of a current flash light beam angle and its relation to the maximum and minimum flash light beam angles.

In different embodiments, the flash forming element is supported by at least one pin suspended in the flash housing.

The flash housing comprises further in different embodiment a simulation light generator element for simulation of the beam lobe of the emitted flash light with a current position of the flash forming element. The simulation light generator element may be arranged at the lens element for simulation.

The flash light characteristically lasts a very short time period. When preparing for capturing an image enlightened with flash light, the simulation light generator element provides a simulation light which can be lit for a substantially longer time period than the flash light. The simulation light simulates the distribution of the flash light. The simulation light has characteristically a beam lobe substantially coinciding with the beam lobe of the flash light with the current position of the flash forming element. The simulation light can be lit while manually adjusting the beam lobe of the simulation light and consequently, the beam lobe of the flash light by means of the zoom element. Therefore the simulation light provides an aid for the photographer to finely adjust the flash light setting. Due to the short duration of the flash light, this fine-tuning or the area in the photograph to be taken which is supposed to be enlightened cannot be made using the flash light itself.

The simulation light generator element may comprise at least two light emitting diode, LED, elements, wherein the at least two LED elements have different beam angles.

The flash housing comprises further in different embodiments a control element arranged to control the brightness of the at least two LED elements based on the motion/rotational position of the zoom element so as to simulate the flash light beam lobe.

The respective LED element may comprise a LED and a lens arranged in the beam path after the LED.

The lens of the respective LED element may be integrated in the lens element.

In different embodiments, the at least two LED elements comprise a first LED element having a beam angle substantially corresponding to a minimum beam angle of the flash light beam lobe and a second LED element having a beam angle substantially corresponding to a maximum beam angle of the flash light beam lobe. The flash housing comprises a control element arranged to control the brightness of the first and second LED elements based on the rotational position of the zoom element so as to simulate the flash light beam lobe.

Different embodiments of the present disclosure further relates to a method for controlling a flash light for photographic purposes. The method comprises the steps of controlling axial movement of a flash forming element within a flash housing by manual rotation of a zoom element rotatably arranged at least partly along a circumference of a lens element of the flash housing; and generating a flash light by means of the flash forming element, wherein at least part of the generated flash light is let out of the flash housing by means of the lens element having a substantially circular cross-section, so as to obtain the flash.

BRIEF DESCRIPTION OF THE DRAWINGS

FIG. 1a is a side view of a flash device according to one example.

FIG. 1b is a view from behind of the flash device in FIG. 1a.

DETAILED DESCRIPTION

The present disclosure relates in different embodiments to controlling of a flash light for photographic purposes. In accordance with the disclosure, a flash light is generated by means of a flash forming element. The flash forming element is axially movable within a flash housing. At least part of the generated flash light is let out of the flash housing by means of a lens element having a substantially circular cross-section, so as to obtain the flash. The axial movement of the flash forming element is controlled by manual rotation of a zoom element rotatably arranged at least partly along the circumference of the lens element.

Figures 1A, 1B:
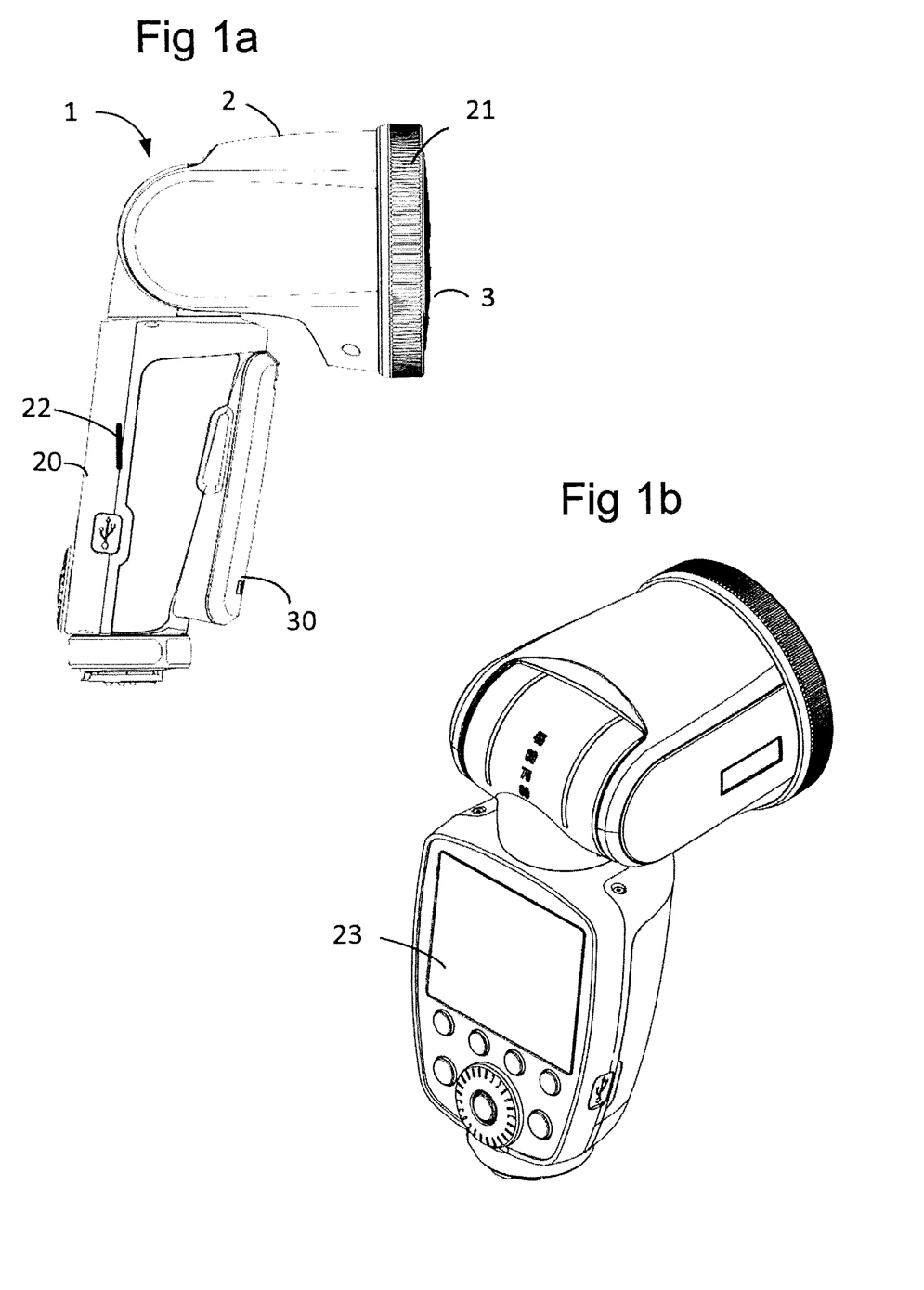

FIGS. 1a and 1b illustrate a flash device 1 according to one example. The flash device 1 is arranged to be used for photographic purposes. According to one example, the flash device 1 is arranged to be releasably attachable to a camera. The flash device 1 comprises in the illustrated example a flash holder 20 and a flash housing 2 hinged onto the flash holder 20. The flash device further comprises a releasable battery 30, attached to the flash holder 20. The flash housing is equipped with a lens element 3 arranged to affect the generated flash light in a desired way.

In the illustrated example, the flash device 1 has further a display element 23. In the illustrated example, the flash device has also a control element 22 for electrical control of the flash device.

Figure 2:
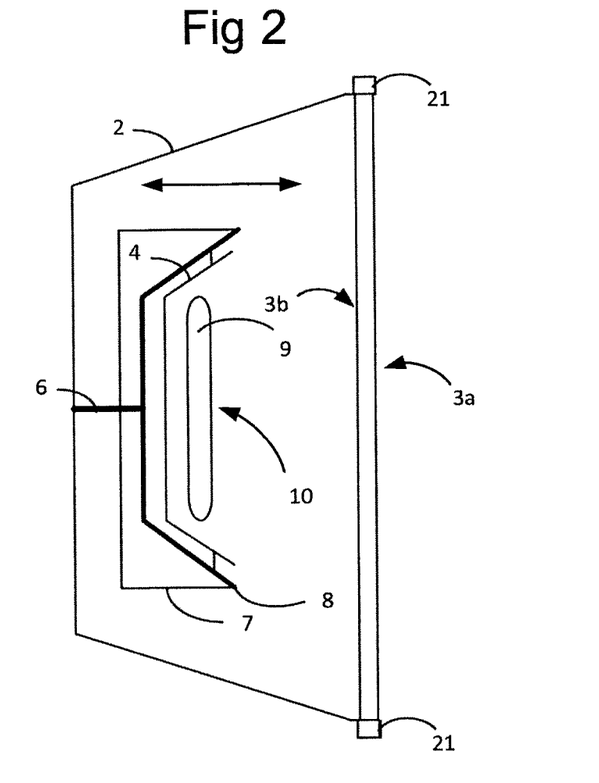
FIG. 2 is a schematic illustration of selected parts of a flash housing.

FIG. 2 schematically illustrates an example of a flash housing 2 for photographic purposes. The flash housing is arranged to emit a flash light having a beam lobe with a desired beam angle. Further, the beam lobe has in one example an essentially circular cross section. The cross section is characteristically arranged perpendicular to a beam axis of the beam lobe.

The flash housing 2 comprises a flash forming element 10 arranged to generate a flash light. The flash forming element 10 comprises in the illustrated example a flash tube 9 partly enclosed by a reflector 4. In a not illustrated example, an alternative flash forming element may be used, for example a lamp and a reflector. The flash tube 9 is in the illustrated example straight. The flash tube may instead have another shape.

The reflector 4 is arranged to reflect at least a part of the flash light emitted from the flash tube in order to direct substantially all of the flash light generated by the flash tube towards a lens element 3. The reflector 4 may further be configured to decrease tube shape characteristics the light to obtain a more round cross section. The reflector 4 has in the illustrated example a three dimensional design. The reflector 4 is in the illustrated example shaped in an essentially oval form. This design secures that substantially all of the flash light generated by the flash tube is directed towards the lens element 3 while at the same time the tube shape characteristics of the light are amended so that the light has a more round cross section.

Normally, if a circular cross section of a beam lobe of a flash light is desired, a circular flash tube, or essentially circular, such as horse shoe shaped, would be selected. In addition, a circular reflector would also be used. However, in this specific case when a straight flash tube is used, the light emitted from the flash tube does not give a beam lobe of a circular cross section. Hence, the emitted beam lobe has to be reshaped in order to be able to create a beam lobe with a circular cross section. This reshaping of the flash light is performed by the shape or form of the reflector in combination with the design of the lens element. Therefore, the shape or form of the reflector in combination with the design of the lens element may be used for forming a beam lobe with a cross section of a desired shape. Thus, by using both the shape or form of the reflector and with the design of the lens element for reshaping the beam lobe, a desired result may be achieved.

The reflector 4 and the flash tube 9 are in the illustrated example arranged in a holding element 8. The holding element 8 may be made of a material which is heat resistant, for example ceramics, glass, metal or similar.

The holding element 8 is in the illustrated example arranged in a carrier 7. The carrier is movably attached to the flash housing 2 by means of a number of guiding elements (not disclosed). The carrier 7 is arranged to be axially movable inside the flash housing 2. A positioner 6 positions the carrier 7 axially in the flash housing 2. In one example, the positioner comprises a step motor. The position of the carrier 7 and thereby the flash tube 9 and the reflector 4 affects a beam angle a of the emitted beam lobe 100. When the carrier is positioned in an end position closest to the lens element, the beam angle of beam lobe 100 is a maximum beam angle for the beam lobe. When the carrier is positioned in an end position most distant from the lens element 3, the beam angle of the beam lobe 100 is minimum beam angle for the beam lobe.

In one example the holding element 8 and the carrier 7 are integrated in one piece.

The flash housing 2 comprises further the lens element 3. The lens element may have a substantially circular cross-section.

The lens element 3 is arranged to let at least part of the flash light generated by the flash forming element out of the housing. Ideally, all of the light generated by the flash forming element is emitted from the flash housing 2. However, some of the flash light may be absorbed by the inner walls of the flash housing 2 etc.

The reflector 4 shape/form and the design of the lens element 3 characteristically cooperate to obtain the flash light beam lobe with an essentially circular cross section x.

The flash housing comprises further a zoom element 21 rotatably arranged at least partly along the circumference of the lens element 3. The zoom element 21 is operatively connected to the flash forming element (not illustrated) so as to control movement of the flash forming element by manual rotation of the zoom element. The zoom element 21 is arranged to control movement of the flash forming element to obtain a flash light having a beam lobe with a desired beam angle.

Figure 3:
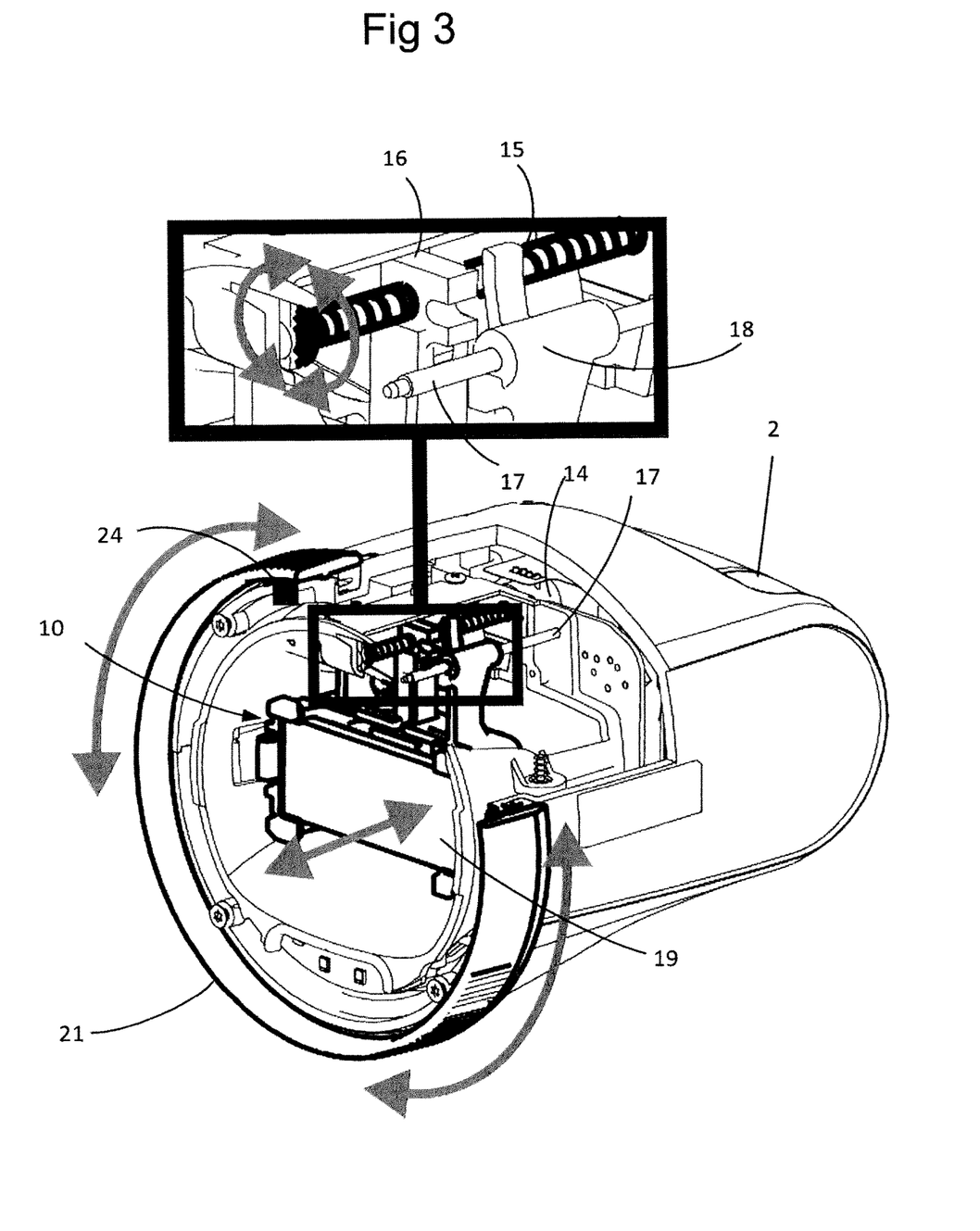
FIG. 3 is a perspective view illustrating an example of the interior of a flash housing.

In FIG. 3, a perspective view of illustrating an example of the interior of a flash housing 2 for photographic purposes is illustrated. The flash housing 2 comprises a zoom element 21 rotatably arranged at least partly along the circumference of the lens element (not shown). The zoom element 21 is operatively connected to the flash forming element 10 so as to control movement of the flash forming element by manual rotation of the zoom element. The zoom element 21 is arranged to control movement of the flash forming element 10 to obtain a flash light having a beam lobe with a desired beam angle.

The flash forming element 10 is axially movable within the flash housing 2 to control the beam angle of the beam lobe.

In one example, the rotational movement of the zoom element 21 is mechanically translated to the axial movement of the flash forming element.

In the example illustrated in FIG. 3, the flash housing 2 comprises a transfer element 24 arranged to transfer the rotational movement or position of the zoom element 21 to an electrical signal. The axial movement or position of the flash forming element 10 is controlled based on the electrical signal. The transfer element 24 comprises for example a potentiometer, a Hall element, optical sensors or the like, arranged to transfer the rotational movement or position of the zoom element to the electrical signal. Different solutions for translating an axial movement or position to an electrical signal are well known in the art and will not be discussed in further detail herein.

The electrical signal controls a positioner 14, 15, 16 for control of the movement or the position of the flash forming element. The flash forming element 10 is axially movable within the flash housing 2 to control the beam angle of the flash light beam lobe. The positioner is arranged to perform control of the positioner between two end positions, wherein when the flash forming element is in a first end position distant from the lens element, the flash light is incident on substantially the entire lens element and when the flash forming element is in a second end position closest to the lens element, the flash light is mainly incident on a center part of the lens element. The flash light beam lobe may have an essentially circular cross section. The cross section is characteristically arranged perpendicular to a beam axis of the beam lobe.

The positioner 14, 15, 16 may comprise a motor 14. The motor may be an electrical motor. The electrical motor may be a step motor 14. The step motor is arranged to provide an angular rotation corresponding to the electrical signal fed to the positioner 14, 15, 16. In the illustrated example, the positioner further comprises a screw element 15. The screw element 15 is rotated axially back and forward by means of the step motor. The positioner may further comprise a guided nut 16 in engagement with the screw element 15. The flash forming element 10 is supported by the guiding nut 16. The guided nut is guided within the flash housing such that it is movable in an axial direction along the screw element and fixed in an angular direction. Thus, the guided nut can not 16 rotate. This is for example obtained by forming a support at least partly around the screw element within which support the guided nut can move axially by being prevented from rotation by the support wall(s). Accordingly, in accordance with this example solution, the flash forming element will be axially controlled back and forward within the flash housing based on the electrical signal provided by the rotation of the zoom element.

In the illustrated example, the flash holding element 10 is supported in a holder, which in turn is fastened to the guided nut 16.

In the illustrated example, the flash forming element, or holder holding the flash forming element, is further supported by at least one guiding pin 17 suspended in the flash housing. This at least one pin is mounted within the housing coaxially with the screw element 15. The function of the at least one simulation light generator element 11 guiding pin 17 is to further secure that the flash forming element is stably arranged within the flash housing and prevented to perform any rotational movements. When the flash holding element is guided by both the screw element and at least one guiding pin, rotational movements around the axis of the screw element/guiding pin(s) and rotational movements along the axis of the screw element/guiding pin(s) may be avoided.

Figure 4:
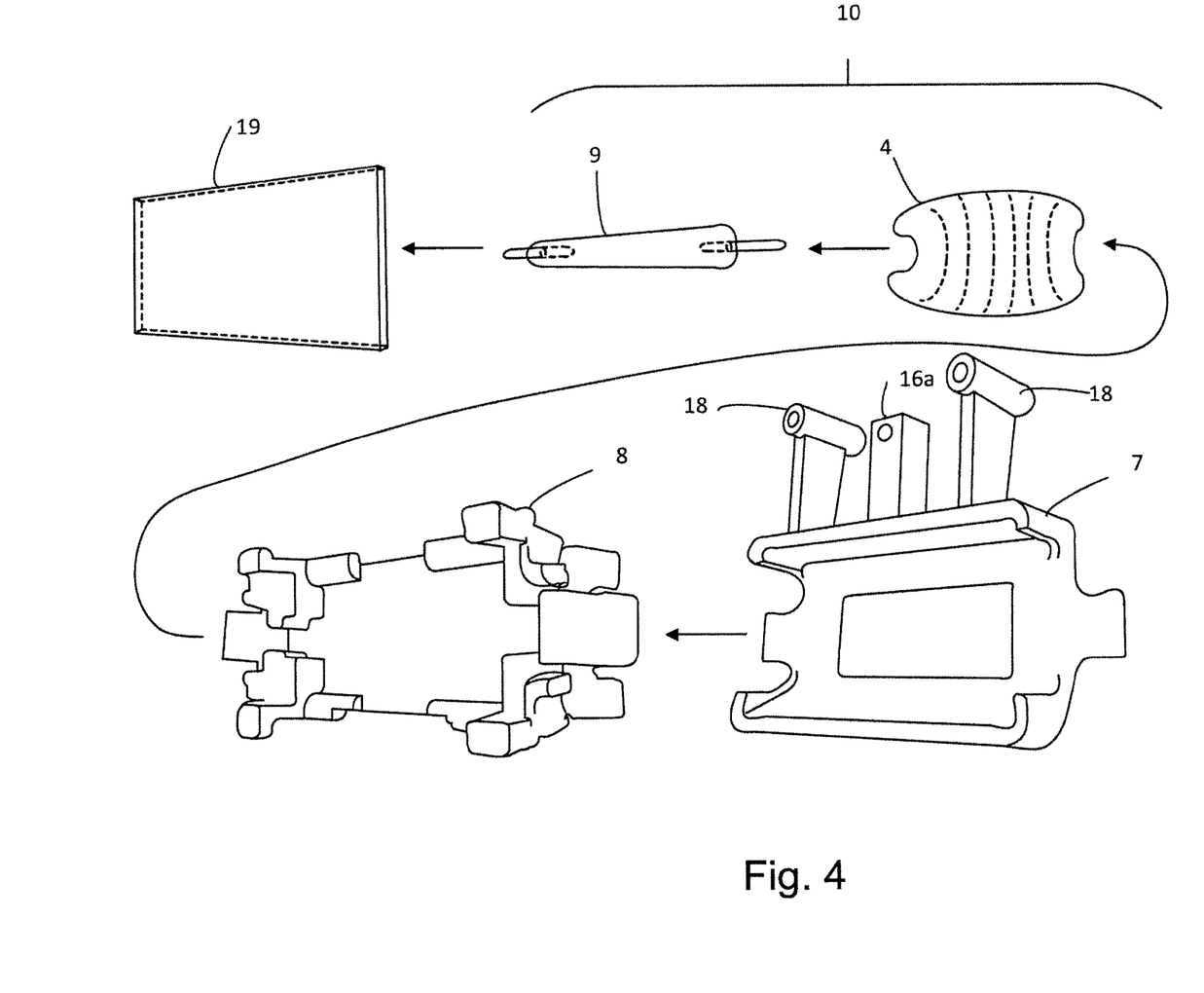
FIG. 4 schematically illustrates components of a flash housing according to different embodiments.
Figure 5:
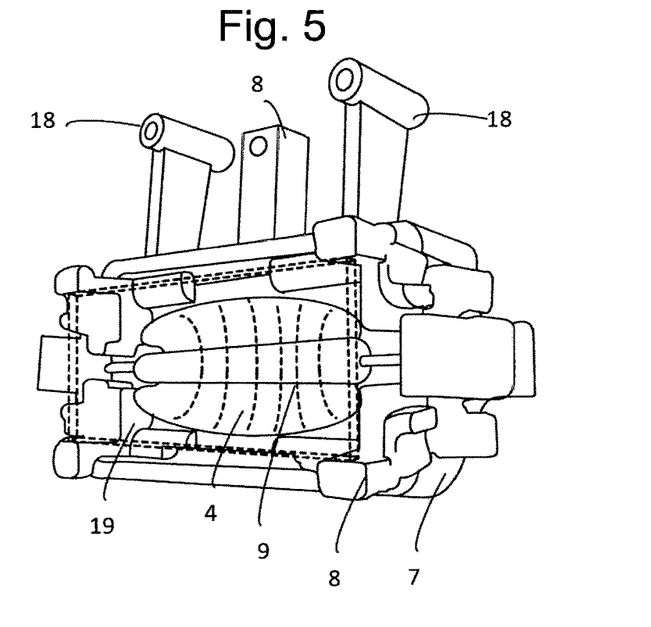
FIG. 5 is a perspective view illustrating the components of FIG. 4 mounted together.

FIGS. 4 and 5 illustrate an example of the design of a flash forming element 10 arranged to generate a flash light and a support therefor. FIG. 4 illustrates an exploded view of exemplified components while FIG. 5 illustrates a mounted view.

In the illustrated FIGS. 4 and 5, the flash forming element 10 comprises a flash tube 9 partly enclosed by a reflector 4. In a not illustrated example, an alternative flash forming element may be used, for example a lamp and a reflector. The flash tube 9 is in the illustrated example elongated. The flash tube 9 is in the illustrated example straight. The flash tube may instead have another shape. However, in small flash devices, such as a flash device which is removably attachable to a camera, the volume within which the flash tube is fitted is limited. It is often difficult to create a small flash tube of a different shape than a straight tube, such as a horse shoe etc.

The reflector 4 may have some or all of the characteristics of the reflector as discussed in relation to FIG. 2.

A semi-transparent element may further be arranged in the beam path after the flash forming element. The semi-transparent element is arranged to transmit light of predetermined first wavelengths and to reflect and/or absorb at least part of light of predetermined second wavelengths generated by the flash forming element.

The reflector 4 and the flash tube 9 and optional semi-transparent element are in the illustrated example arranged in a holding element 8. The holding element 8 may be made of a material which is heat resistant, for example ceramics, glass, metal or similar. In one example, where the semi-transparent element is present, the holding element and the semi-transparent element may encapsulate the flash tube and reflector in a secluded space. When generating flash light, the interior of this secluded space is characteristically heated. The reflector 4 and flash tube 9 encapsulated within this secluded space can characteristically withstand high temperatures. Components outside this secluded space may then be less heat resistant as a part of the heat is kept within the secluded space.

The holding element 8 is in the illustrated example arranged in a carrier 7. The carrier is movably attached to the flash housing 2 by means of a number of guiding pins and a screw element (not shown). The carrier 7 is arranged to be axially movable inside the flash housing 2. A positioner (not shown) positions the carrier 7 axially in the flash housing 2. In one example, the positioner comprises a step motor. The position of the carrier 7 and thereby the flash tube 9 and the reflector 4 affects a beam angle a of the emitted beam lobe. When the carrier is positioned in an end position closest to the lens element, the beam angle a of the beam lobe 100 is a maximum beam angle for the beam lobe. When the carrier 7 is positioned in an end position most distant from the lens element 3, the beam angle a of the beam lobe 100 is minimum beam angle for the beam lobe.

In a not illustrated example the holding element 8 and the carrier 7 are integrated in one piece.

The carrier 7 has a guided nut 16a in for engagement with a screw element (not shown). When the screw element is rotated clockwise and counter-clockwise by means of the step motor, this causes the carrier to move axially back and forward within the flash housing.

The carrier 7 may further have at least one, in the illustrated example two, guiding pin supports 18. At least one guiding pin (not shown) suspended in the flash housing and mounted coaxially with the screw element can then run through the guiding support(s). The at least one guiding pin support 18 is formed as an opening suitable for accommodating the respective guiding pin. The size of the opening is adapted to the size of the pin so that the pin can move freely back and forward therein but with a minimum gap. Thereby the functionality that it is secured that the carrier 7 is stably arranged within the flash housing and prevented to perform any rotational movements. When the carrier 7 is guided both by the screw element and at least one guiding pin, rotational movements around the axis of the screw element/guiding pin(s) and rotational movements along the axis of the screw element/guiding pin(s) may be avoided.

Figure 6A:
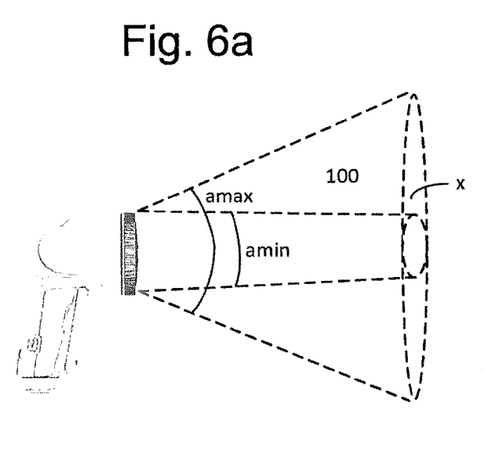
FIG. 6a is s schematic side view of a flash device according to one example, where flash light beam lobes are schematically illustrated.

FIG. 6a illustrates schematically a side view of a flash device, where an example of a maximum and minimum flash light beam angle is schematically illustrated.

Figure 8:
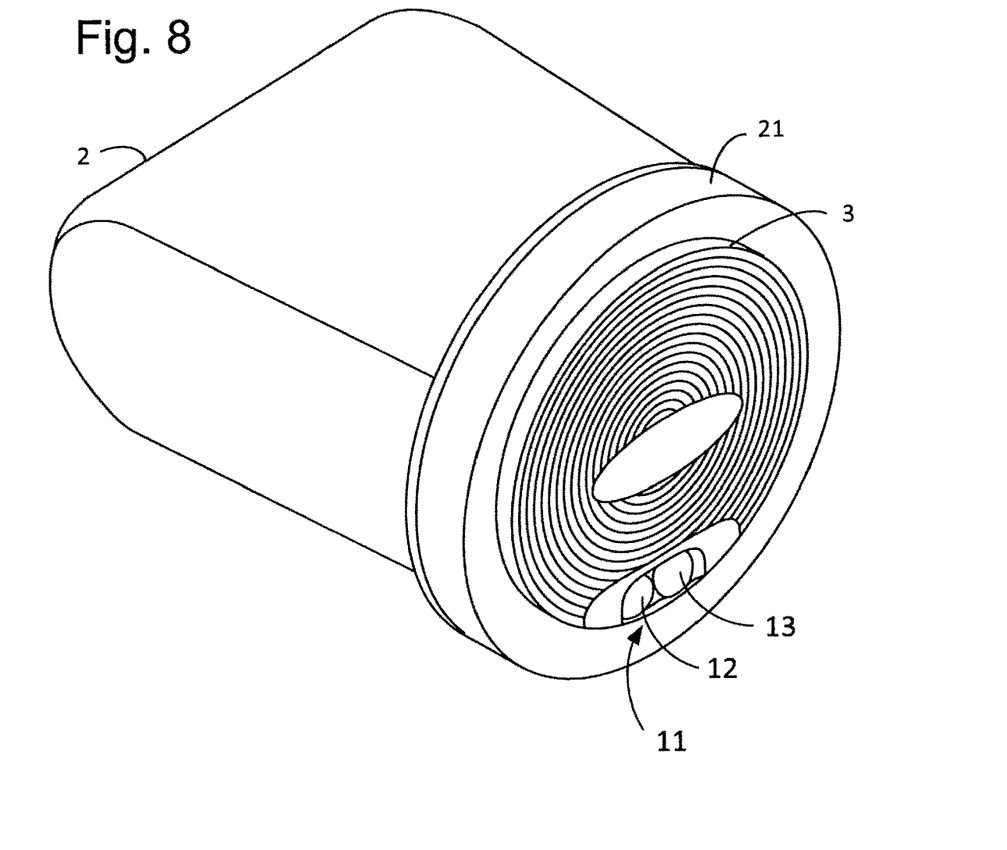
FIG. 8 illustrates an example of a flash housing provided with a simulation light generator element for simulation of a flash light beam lobe.

In FIG. 8, a flash housing 2 for photographic purposes is illustrated, arranged to obtain a flash light with an adjustable flash light beam lobe. The flash housing 2 comprises a lens 3 and a zoom element 21. The zoom element 21 is rotatably arranged at least partly along the circumference of the lens element 3.

A simulation light generator element 11 is arranged at the flash housing for simulation of the beam lobe of flash light emittable from the flash housing. Characteristically, the simulation light generator element is arranged to generate light in accordance with the rotational position/movement of the zoom element in the illustrated example, the simulation light generator element 11 is arranged at the lens element. In the illustrated example, the simulation light generator element is at least partly integrated with the lens element. However, this is only an example. The simulation light generator element may for example be positioned spaced apart from the lens element. The simulation light generator element may for example be arranged within an interior of the flash housing. Alternatively, the simulation light generator element may be arranged anywhere at the exterior of the flash housing or flash device.

The zoom element 21 may further be operatively connected to the flash forming element (not illustrated) so as to control movement of the flash forming element by manual rotation of the zoom element. The zoom element 21 is then arranged to control movement of the flash forming element to enable emission of a flash light having a beam lobe with a desired beam angle while also controlling the simulation light generator element for emission of simulation light with a coinciding beam lobe.

This allows for fine-tuning the design of the flash light so as to use the flash light to enhance the lightning properties of the photograph as much as possible. The flash light characteristically lasts a very short time period. When preparing for taking a picture enlightened with flash light, the simulation light generator element provides a simulation light which can be lit for a substantially longer time period than the flash light. The simulation light simulates the distribution of the flash light. The simulation light characteristically has a beam lobe substantially coinciding with the beam lobe of the flash light with the current position of the flash forming element. This can be used by a photographer by having the simulation light lit while manually adjusting the beam lobe of the simulation light and consequently, the beam lobe of the flash light by means of the zoom element. Therefore the simulation light provides an aid for the photographer to finely adjust the flash light setting. Due to the short duration of the flash light, this fine-tuning of the area in the photograph to be taken which is supposed to be enlightened cannot be made using the flash light itself.

The simulation light generator element 11 comprises in accordance with the illustrated example at least two light emitting diode, LED, elements 12, 13. The at least two LED elements 12, 13 have different beam angles. The flash housing comprises a control element (not illustrated) arranged to control the brightness of the at least two LED elements 12, 13 based on the motion/rotational position of the zoom element so as to simulate the flash light beam lobe. The control element may be formed in a flash device as disclosed in FIGS. 1a, 1b. The control element may instead be arranged elsewhere at the flash device.

The respective LED element 12, 13 may comprise a LED and a lens arranged in the beam path after the LED. In the illustrated example, the lens of the respective LED element is integrated in the lens element.

In accordance with one implementation example, the at least two LED elements 12, 13 comprise a first LED element 12 having a beam angle substantially corresponding to a minimum beam angle of the flash light beam lobe and a second LED element 13 having a beam angle substantially corresponding to a maximum beam angle of the flash light beam lobe. The control element is then arranged to control the brightness of the first and second LED elements individually based on the rotational position of the zoom element so as to simulate the flash light beam lobe. For improving the accuracy of the simulation even more, at least one third LED element may be present having a beam angle between the beam angles of the first and second LED elements.

Figure 6B:
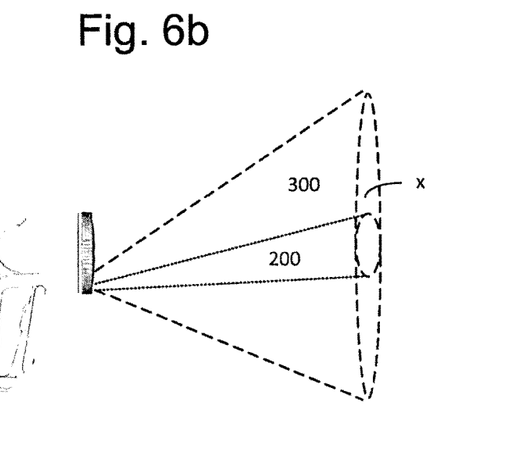
FIG. 6b is a schematic side view of a flash device according to different examples, where LED elements having different beam angles are schematically illustrated.

FIG. 6b illustrates schematically a side view of a flash device, where a beam lobe 200 of a first LED element having a beam angle substantially corresponding to a minimum beam angle of the flash light beam lobe is illustrated. Further, a beam lobe 300 of a second LED element having a beam angle substantially corresponding to a maximum beam angle of the flash light beam lobe is illustrated. The brightness of the first and second LED elements may be individually controlled based on the rotational position of the zoom element so as to simulate the flash light beam lobe. For improving the accuracy of the simulation even more, at least one third LED element may be present having a beam angle between the beam angles of the first and second LED elements.

Figure 7:
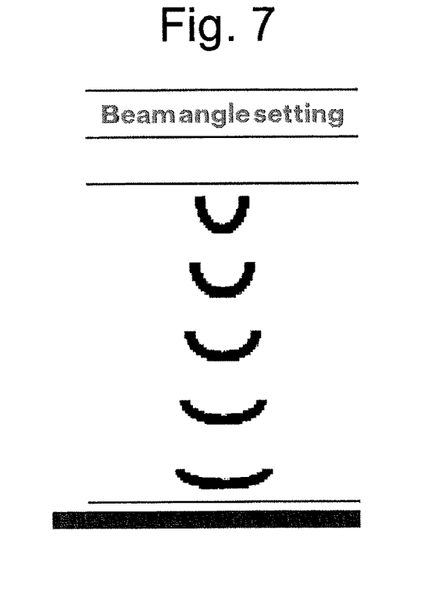
FIG. 7 illustrates examples of different symbol shapes each illustrating a flash light beam angle setting, for display on a display element.

FIG. 7 illustrates an example of different display views for display on a display element. The display element may be formed in a flash device as disclosed in FIGS. 1a, 1b. The display element may instead be arranged elsewhere at the flash device.

In the illustrated exemplary display views, information related to current beam angles, i.e. the position/movement of the zoom are illustrated by the different display views for display on the display element. The beam angles relate to flash light beam angles and consequently also to simulation light beam angles, if a simulation light generator element is present.

In the illustrated example, the display element is arranged to display a symbol, the width of which is dependent on the beam angle. In the particular displayed example, the symbol has a U shape. The symbol instance at the top in figure illustrates a symbol instance representing the minimum beam angle. The symbol instance at the bottom in figure illustrates a symbol instance representing the maximum beam angle. The symbol instances there between illustrate symbol instances between the minimum and maximum beam angle. The number of symbol instances between the minimum and maximum beam angle can be higher and even appear to be continuously vary with the rotation of the zoom element.

Figure 9:
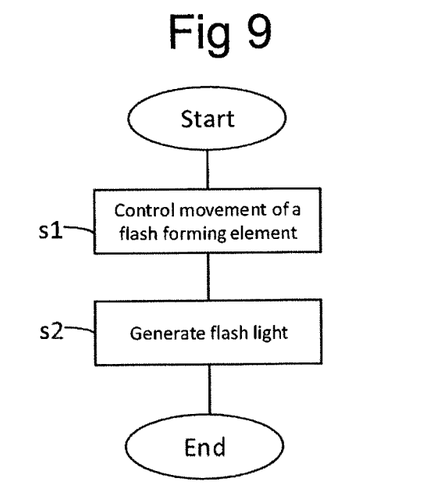
FIG. 9 is a flow chart illustrating an example of a method for controlling a flash light for photographic purposes.

In FIG. 9, a method for controlling a flash light for photographic purposes is illustrated. The method comprises a first step s1 of controlling axial movement of a flash forming element within a flash housing by manual rotation of a zoom element rotatably arranged at least partly along a circumference of a lens element of the flash housing.

The method comprises a second step s2 of generating a flash light by means of the flash forming element, wherein at least part of the generated flash light is let out of the flash housing by means of the lens element having a substantially circular cross-section, so as to obtain the flash.

What is claimed is:

1. A flash housing for photographic purposes, said flash housing comprising:
   a flash forming element arranged to generate a flash light;
   a lens element having a substantially circular cross-section and being arranged to let at least part of the generated flash light out of the flash housing so as to obtain the flash;
   a zoom element rotatably arranged at least partly along the circumference of the lens element and operatively connected to the flash forming element so as to control movement of the flash forming element by manual rotation of the zoom element along the circumference; and
   a transfer element arranged to transfer the rotational movement or position of the zoom element to an electrical signal, wherein an axial movement or position of the flash forming element is controlled based on the electrical signal.

2. The flash housing according to claim 1, wherein the zoom element is arranged to control movement of the flash forming element to obtain a flash having a beam lobe with a desired beam angle.

3. The flash housing according to claim 2, wherein the beam lobe has an essentially circular cross section.

4. The flash housing according to claim 2, wherein the flash forming element is axially movable within the flash housing to control the beam angle of the beam lobe.

5. The flash housing according to claim 4, wherein when the flash forming element is in a first end position distant from the lens element, the flash light is incident on substantially the entire lens element, and when the flash forming element is in a second end position closest to the lens element, the flash light is incident on a center part of the lens element.

6. The flash housing according to claim 1, wherein the rotational movement of the zoom element is mechanically translated to an axial movement of the flash forming element.

7. The flash housing according to claim 1, wherein the transfer element comprises a potentiometer, a Hall element, optical sensors or the like, arranged to transfer the rotational movement or position of the zoom element to the electrical signal.

8. The flash housing according to claim 1, wherein the electrical signal controls a positioner for control of the movement or the position of the flash forming element.

9. The flash housing according to claim 8, wherein the positioner comprises a step motor.

10. The flash housing according to claim 1, further comprising a display element, wherein the information related to the electrical signal is fed to the display element for display of information related to the beam angle.

11. The flash housing according to claim 10, wherein the display element is arranged to display a symbol, the width of which is dependent on the beam angle.

12. The flash housing according to claim 11, wherein the symbol has a U shape.

13. The flash housing according to claim 1, wherein the flash forming element is supported by at least one pin suspended in the flash housing.

14. The flash housing according to claim 2, further comprising a simulation light generator element for simulation of the beam lobe of the emitted flash light with a current position of the flash forming element.

15. The flash housing according to claim 14, wherein the simulation light generator element comprises at least two light emitting diode, LED, elements, wherein the at least two LED elements have different beam angles.

16. The flash housing according to claim 14, wherein the simulation light generator element is arranged at the lens element for simulation of the beam lobe of the emitted flash light.

17. The flash housing according to claim 15, wherein the flash housing comprises a control element arranged to control the brightness of the at least two LED elements based on the motion/rotational position of the zoom element so as to simulate the flash light beam lobe.

18. The flash housing according to claim 15, wherein the respective LED element comprises a LED and a lens arranged in the beam path after the LED.

19. The flash housing according to claim 18, wherein the lens of the respective LED element is integrated in the lens element.

20. The flash housing according to claim 15, wherein the at least two LED elements comprise a first LED element having a beam angle substantially corresponding to a minimum beam angle of the flash light beam lobe and a second LED element having a beam angle substantially corresponding to a maximum beam angle of the flash light beam lobe and wherein the flash housing comprises a control element arranged to control the brightness of the first and second LED elements based on the rotational position of the zoom element so as to simulate the flash light beam lobe.

21. A method for controlling a flash light for photographic purposes, said method comprising:
controlling axial movement of a flash forming element within a flash housing by manual rotation of a zoom element rotatably arranged at least partly along a circumference of a lens element of the flash housing;
generating a flash light by the flash forming element, wherein at least part of the generated flash light is let out of the flash housing by the lens element having a substantially circular cross-section, so as to obtain the flash;
transferring the rotation or position of the zoom element to an electrical signal; and
controlling the axial movement of the flash forming element based on the electrical signal.

22. The method of claim 21, further comprising controlling a step motor that controls the axial movement or position of the flash forming element based on the electrical signal.

23. A flash housing for photographic purposes, said flash housing comprising:
a flash forming element arranged to generate a flash light;
a lens element having a substantially circular cross-section and being arranged to let at least part of the generated flash light out of the flash housing so as to obtain the flash;
a zoom element rotatably arranged at least partly along the circumference of the lens element and operatively connected to the flash forming element so as to control movement of the flash forming element by manual rotation of the zoom element along the circumference, wherein the zoom element is arranged to control movement of the flash forming element to obtain a flash having a beam lobe with a desired beam angle; and
a simulation light generator element for simulation of the beam lobe of the emitted flash light with a current position of the flash forming element.

* * * * *